United States Patent
Oglesbee et al.

(10) Patent No.: US 7,944,218 B2
(45) Date of Patent: May 17, 2011

(54) IMMERSION SENSOR TO PROTECT BATTERY

(75) Inventors: John W. Oglesbee, Watkinsville, GA (US); William C. Bohne, Lawrenceville, GA (US); John E. Hermann, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 277 days.

(21) Appl. No.: 12/347,040

(22) Filed: Dec. 31, 2008

(65) Prior Publication Data

US 2010/0164474 A1 Jul. 1, 2010

(51) Int. Cl.
  *G01R 27/08* (2006.01)
  *G01R 31/36* (2006.01)
(52) U.S. Cl. .............. 324/691; 324/432; 702/63
(58) Field of Classification Search .......... 324/691, 324/432; 702/63
  See application file for complete search history.

(56) References Cited

U.S. PATENT DOCUMENTS

| | | | |
|---|---|---|---|
| 4,147,596 A | 4/1979 | Baboian et al. | |
| 5,260,146 A | 11/1993 | Savovic et al. | |
| 5,306,414 A | 4/1994 | Glass et al. | |
| 5,792,337 A | 8/1998 | Padovani et al. | |
| 5,824,883 A | 10/1998 | Park et al. | |
| 5,948,971 A | 9/1999 | Brooker et al. | |
| 6,556,027 B2 | 4/2003 | Ranks | |
| 6,628,111 B2 | 9/2003 | Shapiro et al. | |
| 6,714,882 B1 * | 3/2004 | Iwaizono | 702/63 |
| 6,902,316 B1 | 6/2005 | Pierce et al. | |
| 6,946,855 B1 | 9/2005 | Hemblade | |
| 6,987,396 B2 | 1/2006 | Yang et al. | |
| 2007/0229294 A1 | 10/2007 | Vossmeyer et al. | |
| 2007/0275296 A1 | 11/2007 | Ueda | |

FOREIGN PATENT DOCUMENTS

| | | | |
|---|---|---|---|
| JP | 2000030759 A | * | 1/2000 |
| JP | 2007-304086 A | | 11/2007 |
| KR | 10-9999-0025348 A | | 4/1999 |
| KR | 10-0196535 B1 | | 6/1999 |
| WO | 2005124328 A3 | | 9/2005 |

OTHER PUBLICATIONS

PCT International Search Report dated Aug. 2, 2010.

* cited by examiner

*Primary Examiner* — Vincent Q Nguyen

(57) ABSTRACT

A system for detecting liquid on a battery or on an electronic device connected with the battery is presented. The battery has an electrical contact for transferring current from the battery to the electronic device. The system includes a sensor for detecting liquid on the battery or on the electronic device and sensor circuitry connected with the sensor. The sensor circuitry prevents current from flowing through the electrical contact of the battery upon detecting liquid.

14 Claims, 4 Drawing Sheets

IMMERSION SENSOR TO PROTECT BATTERY

FIELD OF THE INVENTION

The present invention relates to liquid detection sensors. More specifically, it relates to a battery, which employs a liquid detections sensor in order to protect an external battery contact.

BACKGROUND

Electronic devices often use batteries to supply electric current to the electronic device for power the electronic device. Often times, electronic devices are taken outdoors and exposed to moisture and liquid. For example, firefighters are frequently knee deep in water and Coast Guard and Navy personnel operate in conductive lake and sea water, all taking electronic devices with them.

Ionic liquid, such as water, can corrode corrosive portions of the electronic devices and the batteries within the electronic devices. Corrosive portions can include metallic or conductive portions of the electronic devices and the batteries, such as electrical contacts. In particular, ionic liquid is especially corrosive to conductive portions of the electronic devices or the batteries through which current runs through, such as external battery contacts of batteries or charging contacts of electronic devices. Charging contacts can be exposed to moisture or liquid even when in contact with battery contacts.

Often times, corrosive portions of a battery, such as battery contacts, are shielded from liquid when connected with an electronic device. Sometimes, the electronic device include a water-tight housing which houses the battery and prevents liquid from coming into contact with any corrosive portions of the battery if the electronic device is accidently submerged in a liquid, such as salt water. However, if the battery is not connected with an electronic device, or if the electronic device does not prevent water from contacting corrosive portions of the battery, the corrosive portions of the battery may be exposed to liquid and begin to corrode. If the battery, or an electronic device connected with the battery, is accidently exposed to ionic liquid, for example dropped in sea water, current flowing through the corrosive ionic liquid may not be sufficient to trip overcurrent protection devices of the battery or the electronic device. In this case rapid electrolysis of the corrosive portions of the battery or electronic device may occur, resulting in damage to those corrosive portions which can occur in a short amount of time. As a result, the battery, or electronic device, may no longer be usable because the corrosive portions have been damaged through electrolysis.

As a result, in some instances to solve this problem, the battery may be removed from the electronic device and is kept a liquid proof container, such a plastic bag, in order to prevent corrosion of the battery or corrosion of external battery contacts. However, the battery may not have been properly placed in the container when an accidental contamination by ionic liquid occurs, or the container may have been lost, or the container may have a leak. Additionally, having to place the battery in a liquid proof container every time moisture or liquid may enter an electronic device is cumbersome.

Thus, there exists a need to limit the amount of corrosion on batteries and electronic devices connected with batteries when they are exposed to ionic liquid.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

By detecting the presence of liquid, preferably ionic liquid, using a sensor, and then using circuitry connected with the sensor to prevent current from flowing through electrical contacts of a battery, electrolysis damage to the battery, or to an electronic device connected with the battery, can be reduced or prevented. The sensor and/or circuitry may be contained in the battery and/or an electronic device using the battery. The system for detecting liquid on a battery or on an electronic device connected with the battery thus may be wholly or partially contained within either the battery or electronic device.

Figure 1:
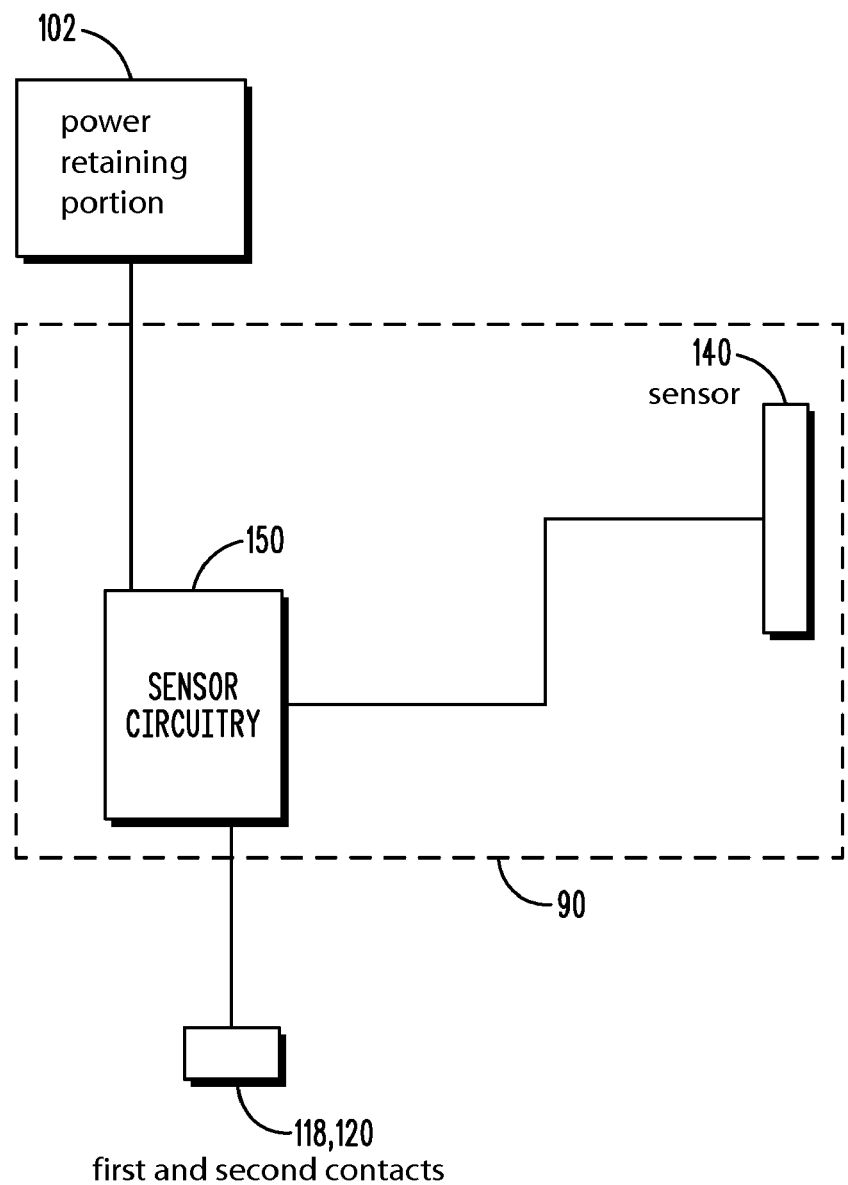
FIG. 1 depicts a block diagram of a system for detecting liquid on a battery or on an electronic device connected with the battery, in accordance with one embodiment of the present invention.

Referring now to FIG. 1, there is shown a system 90 for detecting liquid, preferably ionic liquid such as water, on a battery 100 or on an electronic device connected with the battery 100. The system 90 includes a sensor 140 for detecting the presence or absence of liquid and sensor circuitry 150 in communication with the sensor 140.

The sensor 140 can be located either on, near, or within either the battery 100 or the electronic device 130. As used herein, the term "near" is preferably no more than 10 meters, and more preferably no more than one meter, and most preferably no more than 0.5 meters, and even more preferably no more than 0.25 meters from the battery 100, and more specifically, from a first contact 118, which is present on the battery 100 or from a contact 136 which is present on the electronic device 130. The sensor 140 is for detecting the presence or absence of liquid on, near, or within the battery 100, first contact 118, the electronic device 130, or a contact 136 which is present on the electronic device 130. Sensor 140 includes any sensor which can be used to detect the presence of liquid, and includes, pressure sensors, sensor which detect changes in resistivity, temperature sensors, light sensors, and any sensor which can be used to determine that liquid is present and on or near the sensor. Sensor 140 generates electronic signals having sensor information, which is communicated to sensor circuitry 150. The sensor information is used to determine the presence or absence of liquid and can vary due whether or not liquid is present, and if present, can vary depending on how much liquid is present. Sensor information may be communicated to sensor circuitry 150 in any manner which can transfer analog or digital information, such as wirelessly or via a wire, such as a fiber optic cable, or a metal wire.

Sensor circuitry 150 is in communication with sensor 140 and is connected to battery 100 between power retaining portion 102 of battery 100, at one end, and first and second contacts 118, 120 at the other end, as shown in FIG. 1. Power retaining portion 102 of battery 100 is the part of battery 100 which stores energy, and includes things such as fuel cells, chemical battery cells, capacitors, and any device which can store energy or electrical charge. Power retaining portion 102 is connected to first and second contacts 118, 120 through sensor circuitry 150, providing a flow of current to first and second contacts 118, 120 through sensor circuitry 150. Sensor circuit 150 is also in communication with sensor 140 and receives electrical signals from sensor 140, which include sensor information used to determine the presence or absence of liquid.

If the sensor information indicates the presence of at least a certain amount of liquid, the sensor circuit 150 then disables the flow of current between power retaining portion 102 of battery 100 and the first and second contacts 118, 120 of battery 100, and prevents electrical current from flowing through the first contact 118 of the battery 100 and to an electronic device 130. If the sensor information indicates the absence of liquid or the presence of less than a certain amount of liquid, the sensor circuit 150 then enables the flow of current between power retaining portion 102 of battery 100 and the first and second contacts 118, 120 of battery 100, and allows electrical current from flowing through first and second contacts 118, 120 of the battery 100 and to an electronic device 130.

The absence of liquid does not require the complete absence of liquid, but just less than or equal to an acceptable amount of liquid, beyond which an unacceptable amount of corrosion would occur on battery 100 and/or electronic device 130. Conversely, the presence of liquid does not require the complete absence of liquid, but just less than or equal to an acceptable amount of liquid, beyond which an unacceptable amount of corrosion would occur on battery 100 and/or electronic device 130.

In one embodiment, the sensor circuitry 150 constantly measures the resistivity R of the sensor 140. If the resistivity R of the sensor 140 changes by at least 0.01%, preferably at least 0.1%, more preferably at least 1%, even more preferably at least 10%, and most preferably by at least 90%, then the sensory circuitry 150 prevents current from flowing through the first and second contact, 118, 120 and to the electronic device 130. These percentages may be set as dependent on the desired sensitivity, material limitations, and other factors such as resistance variations due to ambient temperature changes or device temperature ranges when operating and when deactivated. Preferably, the resistivity R of the sensor 140 decreases to indicate the presence of liquid.

Figure 3:
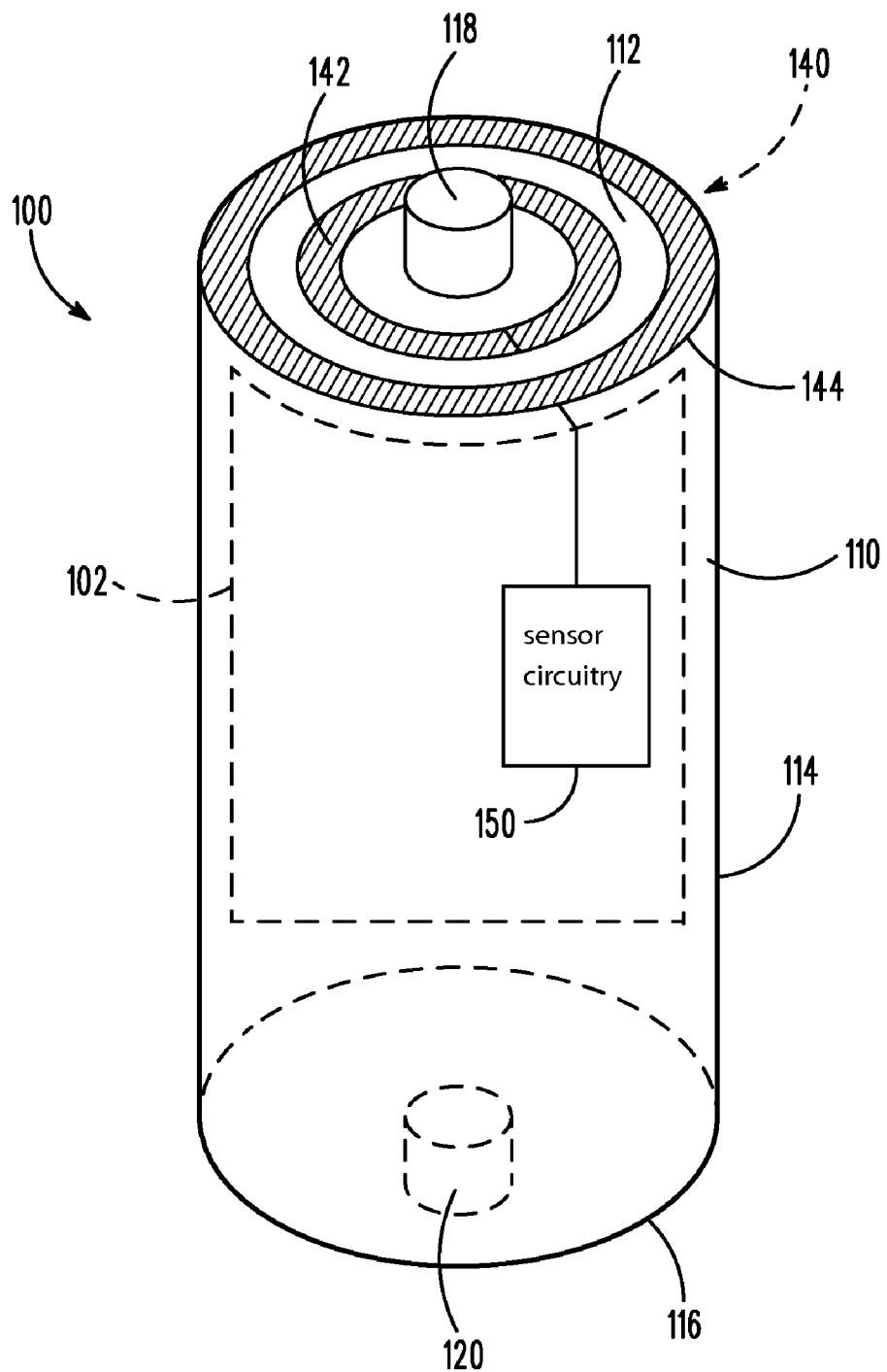
FIG. 3 depicts an electronic device connected with system for detecting liquid, in accordance with one embodiment of the present invention.

Referring now to FIG. 3, in one embodiment, the system 90, or at least a portion of the system 90, is on the battery 100. Battery 100 includes a housing 110 encasing power retaining portion 102 of the battery 100, which stores energy. The housing 110 preferably includes a top surface 112 opposed to a bottom surface 116, wherein a side surface 114 is defined between the top and bottom surfaces 112, 116. Battery 100 includes first contact 118 and preferably second contact 120, wherein first and second contacts 118, 120 allow for current to flow from the power retaining portion 102 of the battery 100, through the housing 110, and to the electronic device 130. Contacts 118, 120 are accessible through housing 110, and preferably extend from or are recessed within the housing 110, and more preferably are exposed through the housing 110. Contacts 118, 120 are preferably formed from a conductive material, such as a metal. Examples of such metals include elemental or compound metals such as copper, brass, steel, nickel, gold, silver, or aluminum. In one embodiment, first contact 118 forms a positive battery terminal and second electrical contact 120 forms a negative battery terminal.

Figure 2:
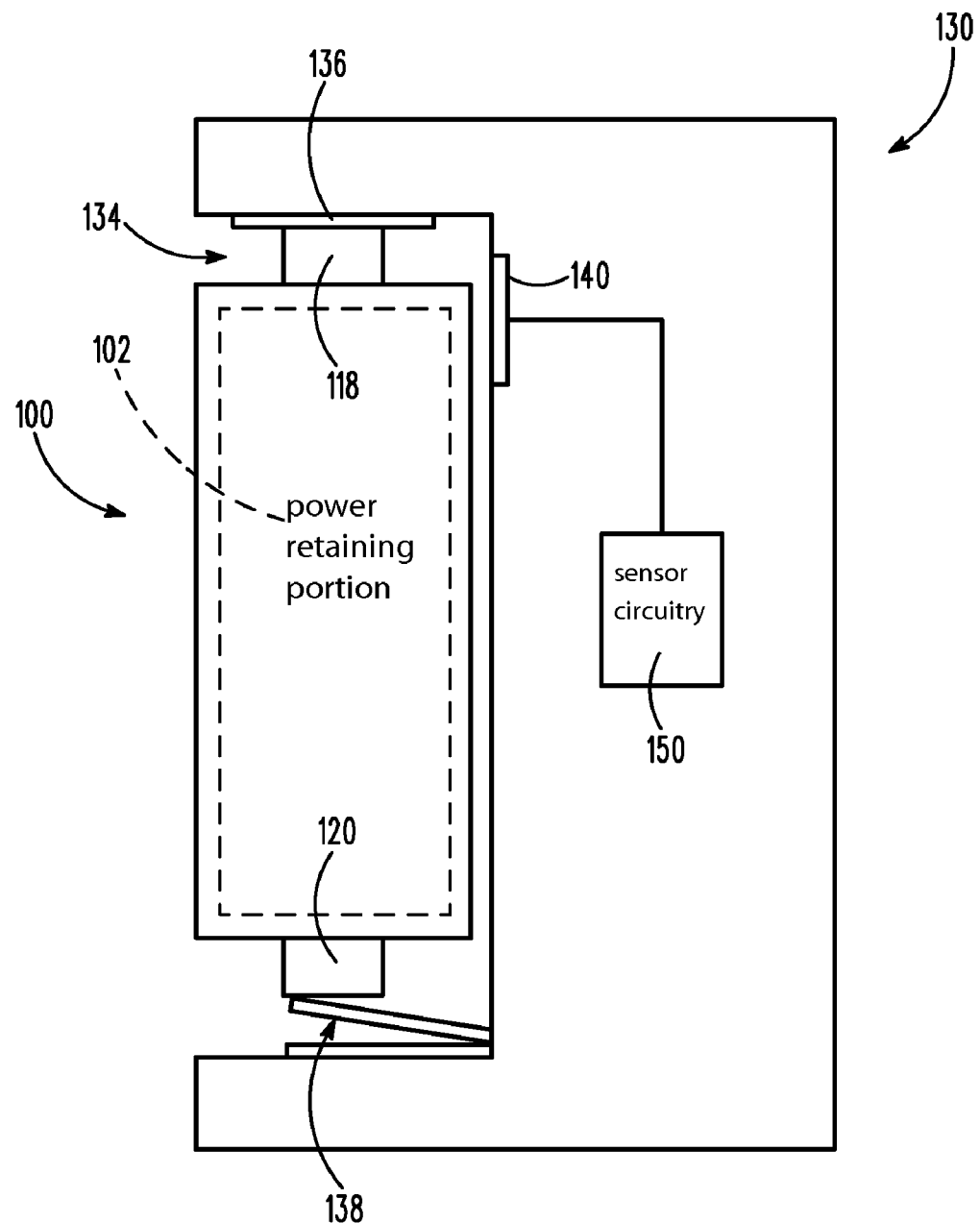
FIG. 2 depicts a battery connected with system for detecting liquid, in accordance with one embodiment of the present invention.

Referring now to FIG. 2, in one embodiment, sensor circuitry 90, or at least a portion of the sensor circuitry 90, is on, near, or within the electronic device 130. The electronic device 130 is any device which uses current from battery 100. Electronic device 130 includes portable electronic devices such as communications devices like telephones, walkie-talkies, and radios; entertainment devices such as portable music players, portable computers, and portable movie players; remote controls; portable GPS devices; portable power tools; and any device which uses a battery for power. Electronic device 130 is preferably connected with battery 100. Electronic device 130 includes first and second contacts 136, 138 which engage first and second contacts 118, 120, respectively, of battery 100, so that power can be transferred from power retaining portion 102 of the battery 100 to the electronic device 130, by transmitting the power through first contact 118 and to first contact 136. Preferably, electronic device 130 includes a housing 132 defining the electronic device 130, where the housing 132 forms a battery compartment 134 for receiving the battery 100. Preferably, the battery compartment 134 includes first contact 136. In one embodiment, the sensor 140 is located within the battery compartment 134, as shown in FIG. 2.

Figure 4:
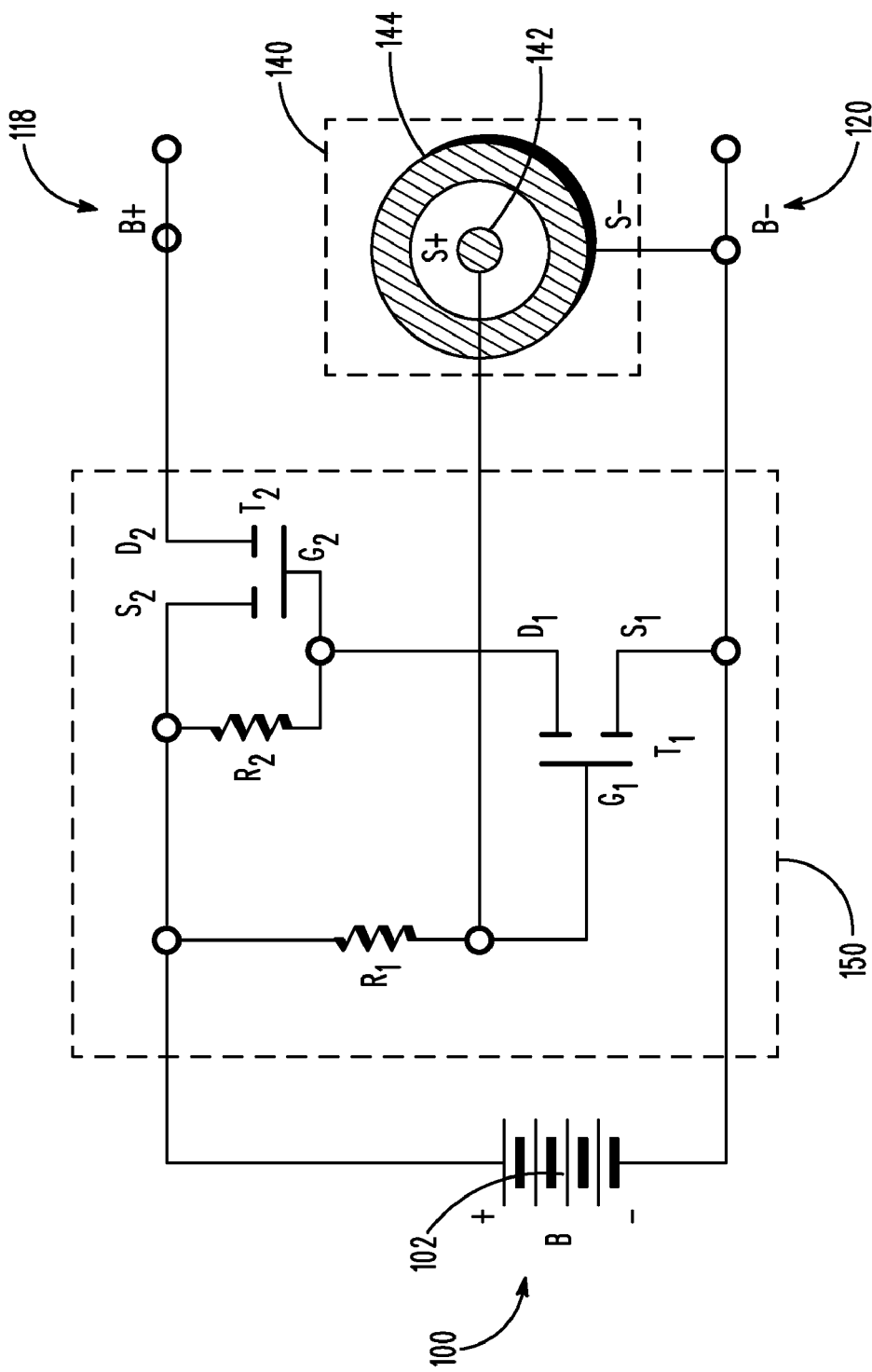
FIG. 4 depicts a block diagram of a system for detecting liquid on a battery or on an electronic device connected with the battery, in accordance with one embodiment of the present invention.

Referring now to FIGS. 3 and 4, in one embodiment, the sensor 140 includes a first sensor contact 142 at least partially encircled by a second sensor contact 144. Preferably, the first and second sensor contacts 142, 144 at least partially encircle, and preferably, completely encircle first contact 118, as shown in FIG. 3. In this embodiment, first and second sensor contacts 142, 144 are made from a conductive material having a resistivity $R_1$ between the first and second sensor contacts 142, 144. The sensor circuitry 150 constantly, or intermittently, measures the resistivity $R_1$ between the first and second contacts 142, 144. If the resistivity $R_1$ between the first and second contacts 142, 144, changes by at least 1%, then the sensory circuitry 150 prevents current from flowing through the first contact 118 and to the electronic device 130. The material between the concentric circles that form the sensor contacts 142, 144 and between the sensor contacts 142, 144 and the first contact 118 is, for example, one or more known insulators.

Referring now to FIG. 4, in one embodiment, sensor circuit 150 includes first and second resistors $R_1$ and $R_2$ along with first and second transistors $T_1$ and $T_2$. In one embodiment, the first and second resistors $R_1$ and $R_2$ have approximately the same resistance. In one embodiment, first and second resistors $R_1$ and $R_2$ are 10 MΩ (mega-ohm) resistors. Preferably, first and second transistors $T_1$ and $T_2$ are field effect transistors. The sensor 140 also includes first and second sensor contacts 142, 144. The first resistor $R_1$ is connected at a first end with both the positive terminal of power retaining portion 102 and a first end of the second resistor $R_2$. The first resistor $R_1$ is connected at a second end with both a first sensor contact 142 and a first gate $G_1$ of the first transistor $T_1$. The second resistor $R_2$ is connected at a first end with both the first end of the first resistor $R_1$ and a second source $S_2$ of the second transistor $T_2$. The second resistor $R_2$ is connected at a second end with both the second gate $G_2$ of the second transistor $T_2$ and the first drain $D_1$ of the first transistor $T_1$. The first source $S_1$ of the first transistor $T_1$ is also connected with both a negative terminal of power retaining portion 102 and the second contact 120 of the battery 100. The second drain $D_2$ of the second transistor $T_2$ is connected with the first contact 118 of the battery 100. The second sensor contact 144 is connected with the second contact 120 of the battery 100.

In operation, second transistor $T_2$ is capable of preventing current from flowing through the first contact 118 if liquid is detected. First transistor $T_1$ and resistors $R_1$ and $R_2$ form an amplifier for detecting liquid. First and second sensor contacts 142, 144 comprise conductive surfaces which sense ionic liquid.

In a first state, when no liquid is in contact with the first and second sensor contact 142, 144, the electrical resistance between the first sensor contact 142 and the second sensor contact 144 is high, for example approximately ten MΩ or more. In the first state, the first resistor $R_1$ and the resistance between the first and second sensor contacts 142, 144 form a voltage divider. In the embodiment described, since these resistances are approximately equal, about one half of the voltage of the power retaining portion 102 is present to bias the first gate $G_1$ of the first transistor $T_1$. This voltage is sufficient to maintain the first transistor $T_1$ in saturation (the "ON" state). In the first state, the first drain $D_1$ of transistor $T_1$ is pulled to essentially the same voltage potential as the negative voltage B− from the power retaining portion 102 of the battery 100. This voltage potential is simultaneously applied to the gate of the second transistor $T_2$, such that the second transistor $T_2$ is also saturated and in the "ON" state. Thus, the transistors $T_1$ and $T_2$ are of opposite type, that is one saturates when a positive voltage is applied to its gate, and the other saturates when a negative voltage is applied to its gate. Since the second transistor $T_2$ is in the "ON" state, the power retaining portion 102 of the battery 100 is effectively connected to the first and second contacts 118, 120 (B+ and B−) and the battery 100 is therefore fully capable in providing power to an external load, such as the load provided by electronic device 130.

In a second state, when liquid is in contact with the first and second sensor contact 142, 144, the electrical resistance between the first sensor contact 142 and the second sensor contact 144 is lower than in the first state, for example approximately two kΩ (kilo-ohms) or less. In the second state, the voltage divider formed by the first resistor $R_1$ and the resistance between the first and second sensor contacts 142, 144 is thus substantially different, most of the voltage from the power retaining portion 102 of the battery 100 being dropped in the first resistor $R_1$. Thus, the voltage used to bias the first gate $G_1$ of the first transistor $T_1$ is insufficient to allow the first transistor $T_1$ to enter saturation. That is, the first transistor $T_1$ is placed in an "OFF" state. In the second state, there is no drain current in the first transistor $T_1$, and therefore there is no voltage across the second resistor $R_2$. In the second state, since there is not sufficient voltage across the second resistor $R_2$ to maintain the bias of the second transistor $T_2$ in the "ON" state, the second transistor $T_2$ immediately turns to an "OFF" state. By having the second transistor $T_2$ in the "OFF" state when liquid is present, the first contact 118 is isolated from the power retaining portion 102 of the battery 100. As a result, no current can flow from first and second contacts 118, 120 through an external circuit to an electronic device 130, for example. As a result, no current would be able to flow through any liquid which is detected as present, and therefore any contacts, such as first and second contacts 118, 120 and/or first and second contacts 136, 138 through which the current would have travelled through, are protected from electrolysis accelerated corrosion.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. An electronic device comprising:
a housing having a first contact;
a battery having a second contact connected with the first contact;
a sensor for detecting liquid; and
sensor circuitry in communication with the sensor, wherein the sensor circuitry prevents current from flowing between the first and second contacts upon the sensor detecting the liquid,
wherein the sensor comprises a first sensor contact and a second sensor contact at least partially encircling the first sensor contact and
wherein the sensor circuitry is connected with both the first and second sensor contacts, and wherein the sensor circuitry prevents current from flowing between the first and second contacts upon detecting liquid on at least one of the first or second sensor contacts.

2. The electronic device of claim 1, wherein the sensor circuitry allows current to flow between the first and second contacts upon failing to detect liquid.

3. The electronic device of claim 1, wherein the first sensor contact at least partially encircles the first contact.

4. The electronic device of claim 1, wherein the sensor circuitry measures the resistance between the first and second sensor contacts.

5. A system for detecting liquid on a battery or on an electronic device connected with the battery, the battery having an electrical contact for transferring current from the battery to the electronic device, the system comprising:
a sensor for detecting the liquid on the battery or on the electronic device; and
sensor circuitry connected with the sensor, wherein the sensory circuitry prevents current from flowing through the electrical contact of the battery upon the sensor detecting the liquid,
wherein the sensor at least partially encircles the electrical contact, and
wherein the sensor includes first and second sensor contacts at least partially encircling the electrical contact.

6. The system of claim 5, wherein the sensor completely encircles the electrical contact.

7. The system of claim 5, wherein the sensor circuitry measures the resistivity of the sensor.

8. The system of claim 7, wherein if the resistivity of the sensor changes by at least 0.01%, then the sensory circuitry prevents current from flowing through the electrical contact and to the electronic device.

9. A method for detecting liquid on a battery, comprising:
detecting the presence or absence of liquid on a surface of the battery using a sensor; and
preventing current from flowing through an electrical contact of the battery upon detecting the presence of liquid, wherein the detecting the presence of liquid uses a sensor which detects changes in resistivity, and wherein the sensor comprises a first sensor contact and a second sensor contact at least partially encircling the first sensor contact.

10. The method of claim 9, wherein the preventing of current from flowing through the electrical contact uses sensor circuitry, wherein the sensor circuitry is connected with both the first and second sensor contacts.

11. The method of claim 9, wherein the sensor is located on the battery.

12. The method of claim 9, wherein the battery includes an electrical contact for transferring current from the battery to another device, and wherein the detecting the presence of liquid includes detecting the presence of liquid around the electrical contact.

13. The method of claim 12, wherein the first sensor contact at least partially encircles the electrical contact.

14. The method of claim 9, further comprising enabling current to flow through the electrical contact of the battery upon detecting the absence of liquid.

* * * * *

UNITED STATES PATENT AND TRADEMARK OFFICE
CERTIFICATE OF CORRECTION

| | | |
|---|---|---|
| PATENT NO. | : 7,944,218 B2 | Page 1 of 1 |
| APPLICATION NO. | : 12/347040 | |
| DATED | : May 17, 2011 | |
| INVENTOR(S) | : Oglesbee et al. | |

It is certified that error appears in the above-identified patent and that said Letters Patent is hereby corrected as shown below:

In Column 3, Line 40, delete "sensory" and insert -- sensor --, therefor.

In Column 4, Line 2, delete "90, or" and insert -- 150, or --, therefor.

In Column 4, Line 2, delete "90, is" and insert -- 150, is --, therefor.

In Column 4, Line 36, delete "sensory" and insert -- sensor --, therefor.

In Column 6, Line 48, in Claim 5, delete "sensory" and insert -- sensor --, therefor.

In Column 6, Line 60, in Claim 8, delete "sensory" and insert -- sensor --, therefor.

Signed and Sealed this
Eleventh Day of December, 2012

David J. Kappos
*Director of the United States Patent and Trademark Office*